(No Model.)
J. W. DEVERO.
BLACKSMITH'S SHEARS.
No. 351,024. Patented Oct. 19, 1886.
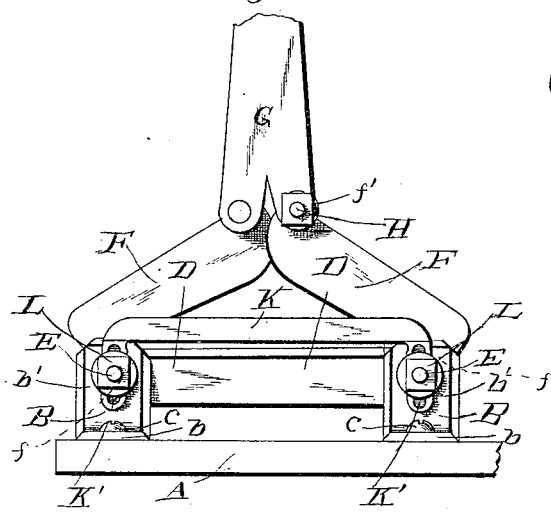
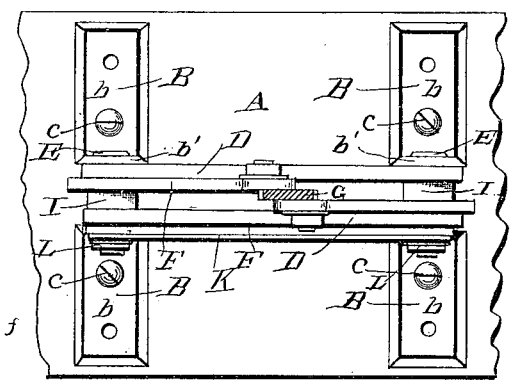
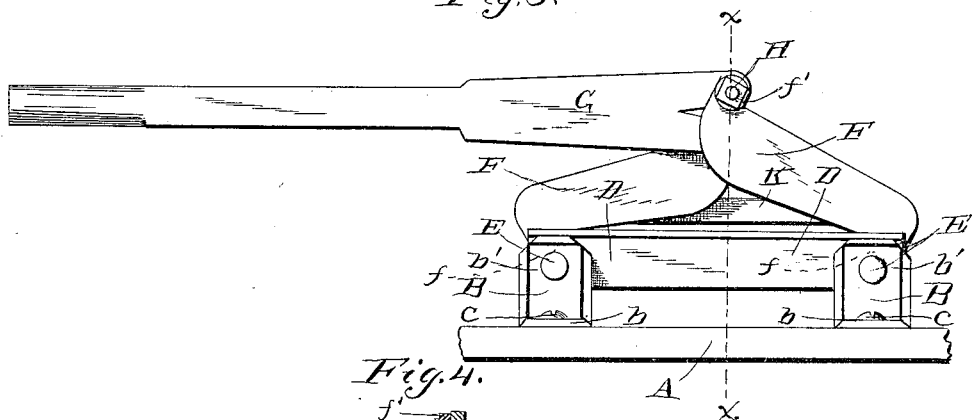
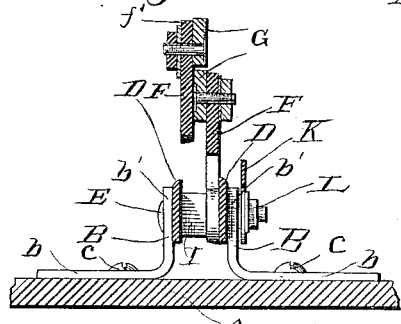
Witnesses
Chas. L. Taylor
J. W. Garner
Inventor
John W. Devero
By his Attorneys
C. A. Snow & Co.

UNITED STATES PATENT OFFICE.

JOHN W. DEVERO, OF CORNING, KANSAS, ASSIGNOR OF ONE-HALF TO GEORGE H. JOHNSON, OF SAME PLACE.

BLACKSMITH'S SHEARS.

SPECIFICATION forming part of Letters Patent No. 351,024, dated October 19, 1886.

Application filed July 19, 1886. Serial No. 208,458. (No model.)

*To all whom it may concern:*

Be it known that I, JOHN W. DEVERO, a citizen of the United States, residing at Corning, in the county of Nemaha and State of Kansas, have invented a new and useful Improvement in Blacksmiths' Shears, of which the following is a specification.

My invention relates to an improvement in blacksmiths' shears for cutting iron bars and plates; and it consists in the peculiar construction and combination of devices that will be more fully set forth hereinafter, and particularly pointed out in the claims.

In the drawings, Figure 1 is a side elevation of my invention. Fig. 2 is a top plan view of the same. Fig. 3 is a reverse elevation. Fig. 4 is a vertical transverse sectional view taken on the line $x\,x$ of Fig. 3.

A represents a table, frame, or block, on which the device is secured.

B represents four rectangular brackets, each of which is provided with a horizontal base-plate, $b$, and a vertical standard, $b'$. These brackets are secured in pairs on the table, block, or frame by means of bolts or screws C, which extend through openings made in the base-plates and enter the said table or block, the said brackets being arranged with their vertical standards facing and opposing each other at a slight distance, and with the base-plates extending outwardly in a line with each other and in opposite directions.

D represents a pair of immovable cutting-jaws, which are arranged horizontally and parallel with each other and a suitable distance apart, the said cutting-jaws being supported by the standards $b'$, and attached to the said standards by means of horizontal transverse bolts E, which pass through openings made in the upper ends of the said standards and openings made in the ends of the jaws D.

F represents a pair of movable jaws, which are provided at their outer ends with depending extensions $f$, and at their inner ends, on their upper sides, with projecting ears $f'$. The depending outer ends of the jaws F are fulcrumed on the bolts E, each of the said jaws having one side bearing against the opposing side of one of the immovable jaws D. The jaws F are considerably shorter than the jaws D, and their inner ends are connected to the lower bifurcated ends of a hand-lever, G, by means of bolts H, which pass through the said lower bifurcated ends of the hand-lever and through transverse openings which are made in the ears $f'$. The lower end of the hand-lever is thus inserted between the opposing sides of the pivoted jaws F, and the lower ends of the said jaws are prevented from moving laterally on the bolts E by means of nuts or blocks I, which are secured on the said bolts and bear between the lower ends of the jaws F and the opposite jaws, D. When the hand-lever G is in a vertical position, the jaws F are opened with relation to the immovable jaws D, the inner ends of the said jaws F being raised from the centers of the jaws D, as shown in solid lines in Fig. 1. When it is desired to cut a bar or plate, the said bar or plate is placed between the opposing sharpened edges of one of the jaws F and one of the jaws D, and the hand-lever is then turned or inclined to one side, thereby causing the jaw F to close upon the jaw D and sever the plate or bar. The other jaw F forms the fulcrum for the hand-lever when one of the jaws F is moved, thus enabling the hand-lever to be swung in either direction, thus causing one of the jaws F to descend while the other jaw F is elevated or opened, thus adapting the machine to cut a bar or plate at each downstroke of the lever, no matter in which direction the said lever may be moved.

K represents a horizontal gage-bar, which is provided with depending slotted ends K'. The ends of the bolts E pass through the said slotted depending ends of the gage-bar, and nuts L are screwed on the threaded outer ends of the said bolt, thereby clamping the depending ends of the gage-bar to the opposing standards $b'$, and adapting the gage-bar to be adjusted vertically, as will be very readily understood.

Having thus described my invention, I claim—

1. The combination of the horizontal immovable jaws D with the pivoted jaws F, having their outer sides bearing against the opposing inner sides of the jaws D, and the hand-lever having its lower end pivoted between the inner ends of the jaws F, whereby either of the said jaws may be caused to close against one of the jaws D by swinging the hand-lever in either direction, substantially as described.

2. The combination of the horizontal immovable jaws D, the jaws F, having their outer ends pivoted between the ends of the jaws D, the outer side of each of the jaws F bearing against the opposing inner side of one of the jaws D, the inner ends of the jaws F approaching each other, the hand-lever having its lower end pivoted to the inner end of the jaws F by means of bolts H, and the gage K, secured on the outer side of one of the jaws D, and vertically adjustable, substantially as described.

In testimony that I claim the foregoing as my own I have hereto affixed my signature in presence of two witnesses.

JOHN W. DEVERO.

Witnesses:
L. JOHN BAKER,
JOHN A. EATON.